Patented Feb. 13, 1934

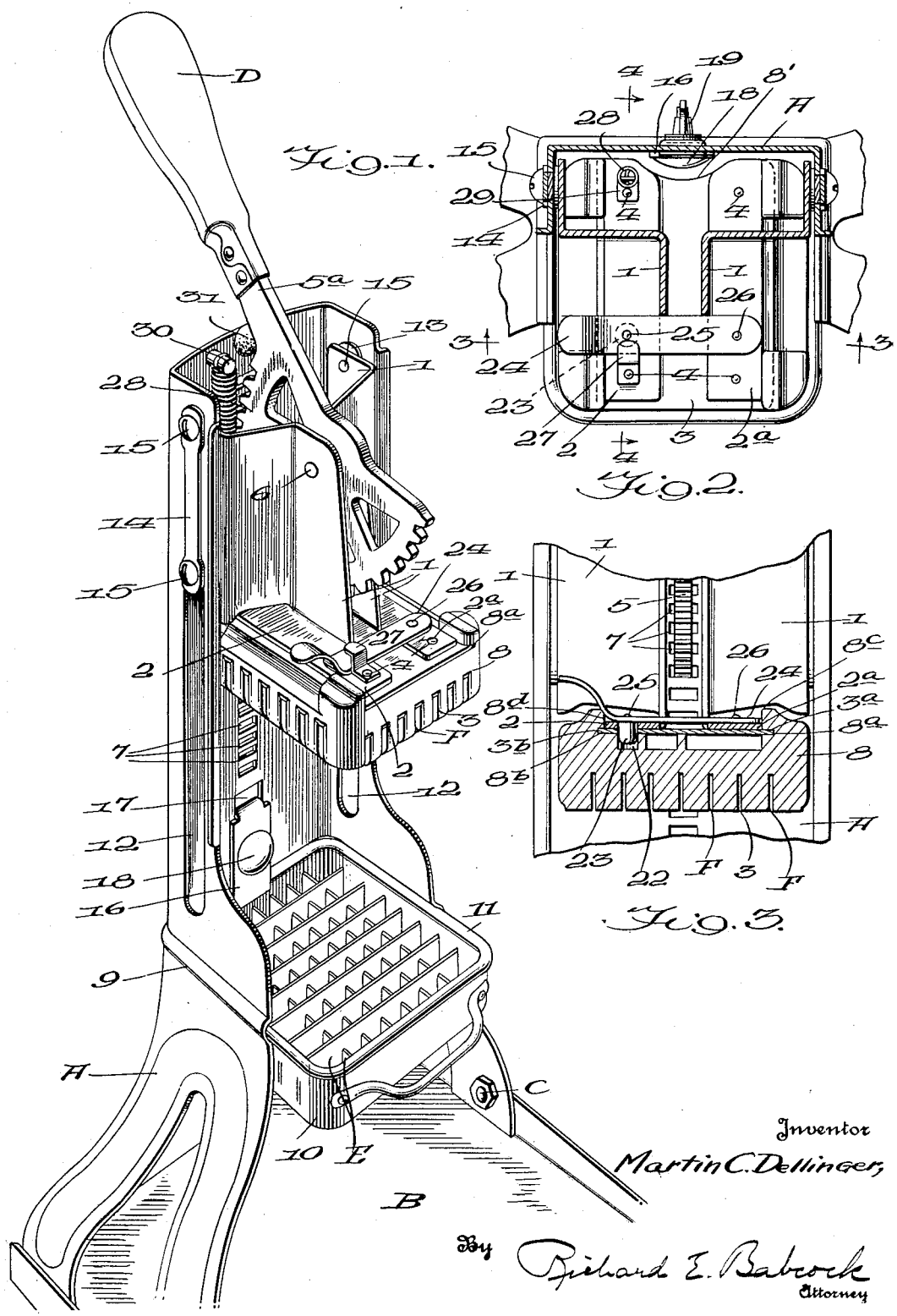

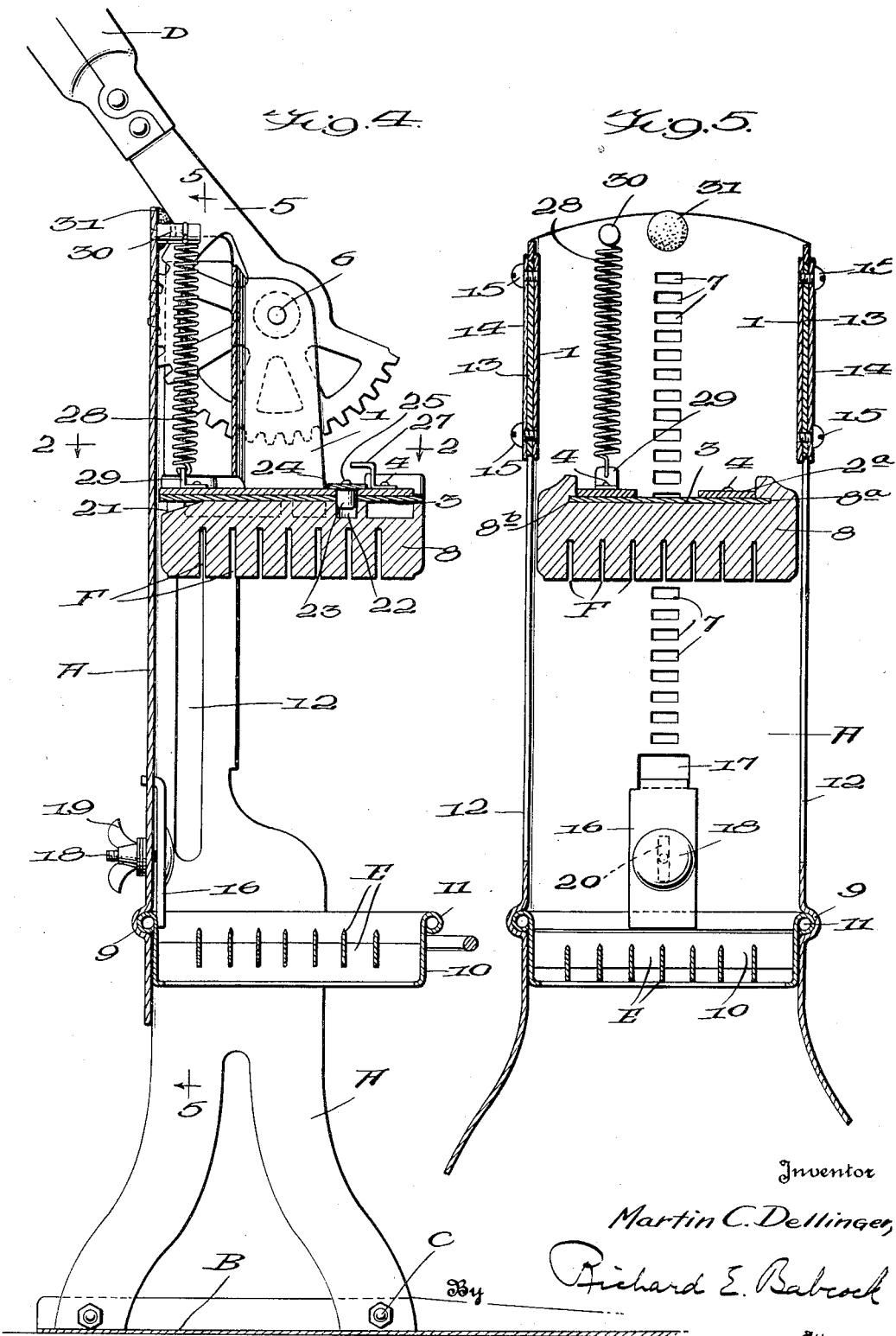

1,947,153

UNITED STATES PATENT OFFICE 1,947,153

FOOD CHOPPER

Martin Cope Dellinger, Lancaster, Pa., assignor of one-half to Harry W. Kulp, Lancaster, Pa.

Application August 3, 1931. Serial No. 554,869

3 Claims. (Cl. 146—169)

This invention relates to food choppers and is directed to certain improvements over the invention forming the subject matter of my pending application, Ser. No. 504,956, filed December 26, 1930, for Food choppers.

The primary objects of the present invention are to provide in such a chopper means for facilitating the application and removal, or interchange, of the presser block; to provide means preventing the incorrect or reverse mounting of the presser block; to provide automatic means for raising the presser block; to provide simple means for guiding the vertical stroke of the carriage; and to provide a light sheet metal operating handle composed of duplicate members adapted to be formed on a single stamping die, thus promoting the economy of production.

In the accompanying drawings:

Figure 1 represents a perspective view of a food chopper embodying my invention;

Figure 2, a cross section on the line 2—2 of Figure 4, looking in the direction of the arrows;

Figure 3, a vertical section on the line 3—3 of Figure 2, looking in the direction of the arrows;

Figure 4, a vertical section on the line 4—4 of Figure 2, looking in the direction of the arrows;

Figure 5, a sectional view on the line 5—5 of Figure 4, looking in the direction of the arrows;

Referring now in detail to the drawings, the chopper comprises a vertical stand A having a flat supporting base B secured to the legs of the stand by any suitable means, such as short bolts with cooperating nuts as indicated at C.

The upper portion of said frame will be of elongated U-shape in cross section and each side of the frame is provided with a long guide slot 12, and associated with the upper part of the frame A to slide vertically thereof and guided therein is a carriage consisting of two sheet metal plates 1, having their lower ends bent to extend at right angles in a horizontal direction for forming plates 2 and 2a, which are connected together by means of rivets 4 passing vertically through said plates 2 and 2a and a lower plate 3, which serves the dual function of connecting said plates 2 and 2a and also serving as a support and attaching means for the presser foot 8.

A vertical series of regularly spaced preferably equal length and duplicate shape slots 7 are formed in the back of the stand A and preferably equi-distant from the sides thereof to form a rack to receive and cooperate with the teeth of the gear lever 5 pivotally mounted between the metal plate 1 of the sliding carriage by means of a pivot pin 6 to provide an easy and simple means for forcing the presser foot 8 down toward and into the cutter 10 which is slidably mounted by means of an upper rim outwardly projecting bead 11 slidably received in the corresponding horizontal groove 9 of the frame A, said cutter carrying a plurality of cutting knives E preferably arranged in two series at right angles to each other and adapted to be received in the correspondingly disposed vertical slots F in the presser 8 when the latter is moved downward. The cutter element 10 will preferably be clamped in its correct position by means of a clamp plate 16 having its upper end hooked through and adapted to slide in and guided by a perforation 17 in the frame A and adapted to be drawn up tightly by means of a nut 19 turning on a bolt 18 extending through said plate 16 and through a slot 20 in the rear of the frame A.

The parts as thus far described and their cooperative relations are common to said pending application, Ser. No. 504,956, and the present application and, being very fully described in detail in the former, it is not thought that further description herein is necessary or desirable.

Preferably the plates 1 of the carriage will have portions extending closely adjacent to, or in rubbing contact with, the sides of the upper portion of the frame A and across the respective slots 12 therein. Guiding plates 13 making a snug sliding fit in the slots 12 respectively and extending in a vertical direction for nearly the full length of the corresponding portions of the respective plates 1 are respectively held thereto by means of outer plates 14 and pairs of screws 15 passing through said plates 14, said guide plates 13 and said portions of the respective plates 1. Said outer plates 14 will preferably have enlarged upper and lower end portions extending beyond each side of the respective slots 12 so as to bear on the respective faces of the frame A adjacent the respective slots.

The rear face portion of the presser block or foot 8 is recessed as at 8′, preferably in a curved or arcuate form in a horizontal plane so as to permit said presser foot or block 8 to move downward past the rounded head of the bolt 18 and past the clamping plate 16. Said presser foot 8 is so formed as to be slidably applied to, and removed from, the movable carriage in a horizontal direction from front to rear of said carriage, preferably by means of grooves receiving the respective side edge portions of the tie-plate 3 and will preferably be so related to the tie-plate 3 and other portions of the carriage that it can only be slidably applied to the carriage when said recess 8' is presented rearward toward the head of the bolt 18. To this end the side portion 3a of plate 3 extending laterally beyond plate 2a will extend considerably further in that lateral direction beyond the adjacent side edge of plate 2a, than the corresponding outer side edge portion 3b of said plate 3 with relation to the corresponding laterally outer edge of the plate 2 with relation to the corresponding side edge portion of the plate 3, and the presser foot 8 is provided with correspondingly formed horizontal grooves 8a and 8b extending in a direction from front to rear of the block, the groove 8a being considerably deeper than the groove 8b and respectively slidably receiving the portions 3a and 3b of said plate 3. Said block 8 is formed with a face 8c extending vertically from the inner end of the slot 8a and normally making a sliding fit against the outer edge face of plate 2a and with a similar vertical face 8d similarly disposed with relation to the slot 8b and similarly making a sliding contact with the laterally outer edge face of the plate 2 during the application of the block 8 to the carriage. From the foregoing it follows that if any attempt be made to force the block 8 on to the plate 3 when the recess or notch 8' is presented away from the bolt 18, the upper portions of the block 8 respectively adjacent the faces 8c and 8d will strike against the forward ends of the laterally portions of the plates 2 and 2a respectively and so positively prevent the application of the presser foot 8 to the carriage in such reversed inoperative position.

In order to lock or latch the block 8 in proper mounted position against displacement in a front to rear direction, I form the upper portion of said block 8 with a socket or recess 22 adapted to receive a locking pin 23 mounted on a leaf spring 24 by any suitable means, such as a rivet 25, and normally projecting through registering perforations in the plate 2 and plate 3 into said socket 22. Said leaf spring 24 may be mounted on the plate 2a by any suitable means, such as a rivet 26 and may be limited in its upward movement away from the plate 2 by any suitable means, such as a stop finger or lug 27 held in place by one of the rivets 4. Preferably said block 8 will be formed with a rearwardly and downwardly inclined surface 21 adapted to register in a line from front to rear with the downwardly projecting end of the pin 22 so as to engage and raise the same as the block 8 is shoved into position.

A helical tension spring 28 having its upper end anchored or hooked about a pin 30 rigidly mounted in the upper rear portion of the frame A and having its lower end hooked into a little lug or cleat 29 secured to the rear end of the plates 2 and 3 by means of one of the fastening rivets 4 serves to automatically retract the carriage to its raised position when the handle D is released, and a cushioning element 31 secured to the extreme upper portion of the frame A in line with the rack 7 and path of movement of the shank 5a of the gear 5 serves as a bumper for the handle of said shank 5a of said gear 5, and said cushion 31 may be of any suitable material, such as rubber or felt.

Having thus described my invention, what I claim is:

1. A food comminuter comprising a frame having a guideway of channel form with parallel vertical sides formed with registering vertical guide slots, a carriage extending between the sides of said guideway and having side portions of substantial vertical length disposed closely adjacent, and substantially parallel, to said sides of said guideway, in combination with vertical guide plates of substantially the same vertical length as the respective sides of said carriage disposed closely adjacent, and parallel, to the outer side faces of said sides respectively and extending for their full lengths in said guide slots respectively, outer plates disposed on the outer faces of the sides of the frame in registry with said guide plates and having portions extending over and in sliding engagement with, the outer faces of said sides of the frame adjacent said guide slots respectively, and pairs of securement means extending through the respective outer plates and side portions of said carriage and the respective intervening guide plates.

2. A food comminuter comprising a frame having a guideway of channel form with parallel vertical sides formed with registering vertical guide slots, a carriage extending between the sides of said guideway and having side portions of substantial vertical length disposed closely adjacent, and substantially parallel, to said sides of said guideway, in combination with vertical guide plates of substantially the same vertical length as the respective sides of said carriage disposed closely adjacent, and parallel, to the outer side faces of said sides respectively and extending for their full lengths in said guide slots respectively, outer plates disposed on the outer faces of the sides of the frame in registry with said guide plates and having portions extending over and in sliding engagement with, the outer faces of said sides of the frame adjacent said guide slots respectively, and pairs of securement means extending through the respective outer plates and side portions of said carriage and the respective intervening guide plates, and automatic means tending to raise said carriage to its highest position.

3. In a food comminuter comprising a frame, a carriage mounted for reciprocation in said frame, and a comminuting element adapted to be removably mounted in line with the path of travel of said carriage, in combination with a pair of outwardly presented vertically extending faces of portions of said carriage, portions of a plate of said carriage respectively extending laterally outward beyond said vertical faces respectively, one of said portions extending laterally to a greater distance with respect to the corresponding vertically extending face than the other of said portions, and a presser block formed with two opposed slots corresponding in position and in length in a lateral direction to said laterally extending portions of said plate of the carriage to slidably receive said portions in a direction from rear to front of said block, and said block being formed with faces extending vertically from the inner ends of said slots substantially slidably engaging the respective opposed laterally outwardly presented vertically extending faces of said portions of said carriage.

MARTIN COPE DELLINGER.